United States Patent
Schulz et al.

(10) Patent No.: US 6,360,237 B1
(45) Date of Patent: Mar. 19, 2002

(54) METHOD AND SYSTEM FOR PERFORMING TEXT EDITS DURING AUDIO RECORDING PLAYBACK

(75) Inventors: David E. Schulz; Colin W. Wightman, both of St. Peter, MN (US); Michael D. Crovitz, Kingston, WA (US)

(73) Assignee: Lernout & Hauspie Speech Products N.V., Ieper (BE)

( * ) Notice: Subject to any disclaimer, the term of this patent is extended or adjusted under 35 U.S.C. 154(b) by 0 days.

(21) Appl. No.: 09/166,363

(22) Filed: Oct. 5, 1998

(51) Int. Cl.[7] .............................................. G06F 15/00
(52) U.S. Cl. ........................ 707/531; 707/530; 704/251; 704/246; 704/231
(58) Field of Search ................................ 707/531, 530; 704/231, 246

(56) References Cited

U.S. PATENT DOCUMENTS

| | | | | |
|---|---|---|---|---|
| 5,101,375 A | * | 3/1992 | Goldhor | 707/531 |
| 5,127,055 A | * | 6/1992 | Larkey | 704/244 |
| 5,231,670 A | * | 7/1993 | Goldhor et al. | 704/275 |
| 5,386,581 A | * | 1/1995 | Suzuki et al. | 707/515 |
| 5,649,060 A | * | 7/1997 | Ellozy et al. | 704/278 |
| 5,649,234 A | * | 7/1997 | Klappert et al. | 707/500.1 |
| 5,737,725 A | * | 4/1998 | Case | 704/260 |
| 5,794,249 A | * | 8/1998 | Orsolini et al. | 707/104 |
| 5,801,685 A | * | 9/1998 | Miller et al. | 707/500.1 |
| 5,875,429 A | * | 2/1999 | Douglas | 704/275 |
| 5,875,448 A | * | 2/1999 | Boys et al. | 707/531 |
| 6,122,614 A | * | 9/2000 | Kahn et al. | 704/235 |
| 6,161,087 A | * | 12/2000 | Wightman et al. | 704/215 |
| 6,199,076 B1 | * | 3/2001 | Logan et al. | 707/501 |

FOREIGN PATENT DOCUMENTS

EP 649144 A1 * 4/1995

OTHER PUBLICATIONS

Lernout and Hauspie Speech Products N.V., L&H Voice Express manual, 1997–1999, pp. 1–4, 37–56.*

* cited by examiner

Primary Examiner—Stephen S. Hong
Assistant Examiner—Cong-Lac Huynh
(74) Attorney, Agent, or Firm—Bromberg & Sunstein LLP (57) ABSTRACT

A method for editing written text in a text editor which automatically aligns a cursor in the written text on a screen with a particular spoken word during playback of an audio recording. The method may comprise aligning the cursor in a targeted insertion point in response to a user's input, performing one or more editing functions at the targeted insertion point, and realigning the cursor with the spoken words.

13 Claims, 4 Drawing Sheets

The patient hurt{ } his leg{ } in an automobile accident{ } his{ } pain is{ } usually

FIG. 4a

The patient hurt{ } his leg{ } in an automobile accident.{ } his{ } pain is{ } usually

The patient hurt{ } his leg{ } in an automobile accident.{ } his{ } pain is{ } usually

The patient hurt{ } his leg{ } in an automobile accident.{ } His{ } pain is{ } usually

FIG. 4d

The patient{ } hurt{ } his leg{ } in an automobile accident{ } his{ } pain is{ } usually

FIG. 5a

REACTION TIME VARIABLE
 72

METHOD AND SYSTEM FOR PERFORMING TEXT EDITS DURING AUDIO RECORDING PLAYBACK

BACKGROUND OF THE INVENTION

1. Field of the Invention

This invention relates to text editing methods and systems. More particularly, this invention relates to computerized methods and systems for editing text during the playback of audio recordings for transcription. The methods and systems are implemented in computer hardware and software. This invention is related to a application, application Ser. No. 09/166,364, filed on even date herewith, entitled "Speech-Recognition-Assisted Selective Suppression of Silent and Filled Speech Pauses During Playback of an Audio Recording," which is incorporated herein by reference date herewith, entitled "A Method for Controlling Playback of Speech."

2. Background Information

Dictation and transcription of recorded speech are commonly used in a variety of professions, such as in the legal and medical fields. Transcription is typically done by human transcriptionists who listen to an audio recording of a dictation and type the recorded speech into a word processor. Because transcription is an expensive process, automation of the process is important to reduce costs.

Speech recognition systems have helped to reduce transcription costs. Automatic speech recognition is the process of using a computer to convert spoken language into written text. In speech recognition systems, speech is typically recorded and fed to a speech recognition unit. The speech recognition unit produces a draft of the transcription, and then a transcriptionist edits the draft to produce a final, quality transcription copy.

If a speech recognition system could perform perfect transcription, the output text would need little or no editing to appear as accurate transcribed text. However, even if the speech recognition system were nearly flawless, speech that is not meant to be part of the transcribed text, such as punctuation indicators, paragraph indicators, corrections or other instructions for a transcriptionist, may appear as the text output of the speech recognition system. Background speech, such as a conversation between the dictator and another person that is not meant to be recorded, may also become part of the transcribed speech. Therefore, even if a speech recognition system were nearly flawless, there would typically be errors in the transcribed text output. Speech recognition systems may also have trouble producing quality results if a speaker has a strong accent or speaks with poor grammar. In many situations, therefore, a transcriptionist is needed to edit the text resulting from a speech recognition system to produce quality transcribed text.

To enable editing of the text output from a speech recognition system it is essential that the transcriptionist have access to the original audio recording during the editing process. Some editing programs provide a way of aligning or identifying the spoken word with the written text during playback of the audio recording to facilitate the editing work of the transcriptionist. Typically, for example, the transcriptionist can activate playback of the original dictation and each word will be highlighted in some way as it is spoken. Whenever the transcriptionist sees an error, the transcriptionist may stop playback of the dictation, correct the error, and then resume playback of the dictation. Some custom editors may also be voice controlled so that the transcriptionist can edit the text without ever touching a keyboard.

A fundamental problem with this typical approach to editing the text resulting from a speech recognition system is that most text editing programs were not designed for this type of use. Most text editing programs were designed to allow the user to type rapidly and to fix mistakes as the user types them. There are many kinds of errors typically made by speech recognition units that are time-consuming and thus expensive to correct. For example, a simple mistake, such as a missed period, requires several keystrokes to repair. The transcriptionist must position the cursor at the end of the last word of the sentence and type a period. Next, an extra space needs to be added. Then cursor must be positioned at the first word of the next sentence, and the first letter of that word must be deleted and retyped as a capital letter. Thus, to fix a simple mistake such as a missed period requires a minimum of five keystrokes. In a program where the cursor is automatically aligned with the audio during playback, when the transcriptionist finds a mistake, he or she needs to stop playback of the audio recording, position the cursor at the point necessary for correction, perform each keystroke to fix the mistake, and then resume playback of the audio recording, which may now need to be rewound. This can be a slow process for fixing mistakes that makes playback-based editing of transcribed text expensive.

It should also be recognized that the transcriptionist is working in a complex environment. He or she may be viewing text on a monitor and simultaneously listening to an audio playback, both of which are continuously changing. To control these and perform editing, the transcriptionist may not only apply both hands to the computer keyboard but also may optionally use a foot control to start and stop and move forward in or rewind the audio recording. Achieving efficient use of these various inputs and controls is a nontrivial task.

A method and system is needed to improve the editing efficiency of text generated by speech recognition systems. More particularly, a system and method is needed in a playback-based text editing system where the text editor aligns or identifies the written word with the spoken word during playback to allow the transcriptionist to edit the draft with little or no stopping of the audio playback. The system and method ideally allows the editing process to take the same amount of time as playback of the audio recording without interruptions to stop and fix text.

SUMMARY OF THE INVENTION

A method for editing written text in a text editor which automatically aligns a cursor in the written text on a screen with a particular spoken word during playback of an audio recording. The method may comprise aligning the cursor in a targeted insertion point in response to a user's input, performing one or more editing functions at the targeted insertion point, and realigning the cursor with the spoken words. The act of aligning may further comprise adjusting the cursor location by a reaction time variable. In another embodiment, the act of aligning may further comprise determining whether the targeted insertion point is an appropriate insertion point for one or more text edits, and adjusting the cursor location to an appropriate insertion point if the targeted insertion point is inappropriate.

In another embodiment of the invention, the method comprises identifying, in response to a user's input, a targeted insertion point for one or more text edits, wherein the act of identifying comprises the act of adjusting the cursor location by a reaction time variable, performing one or more editing functions at the targeted insertion point, and realigning the cursor with the spoken words. In another embodiment, the method comprises performing one or more editing functions at a position defined in response to a user's input, wherein a single keystroke by the user causes such editing functions to be executed starting at an insertion point identified by the cursor location of the text editor, wherein the single keystroke causes one or more edits normally requiring multiple keystrokes.

In another embodiment, the method comprises accepting a single keystroke command from a user to perform an editing function in the written text, wherein the single keystroke causes one or more edits normally requiring multiple keystrokes, and coordinating the editing function resulting from the keystroke with a targeted insertion point, wherein the targeted insertion point is identified by the location of the cursor as it automatically moves through the written text in coordination with playback of the audio recording.

Yet another embodiment of the invention is a method for editing written text in a text editor. The method comprises aligning a cursor in the written text at a targeted insertion point in response to a user's input, determining whether the targeted insertion point is an appropriate insertion point for one or more text edits, adjusting the cursor location to an appropriate insertion point if the targeted insertion point is inappropriate, and performing one or more text edits at the appropriate insertion point.

Another embodiment of the invention is an apparatus for editing written text. The apparatus comprises a text editor that automatically aligns a cursor in the written text with a particular spoken word during playback of an audio recording, and software containing instructions to align the cursor in a targeted insertion point in response to a user's input, perform one or more editing functions at the targeted insertion point, and realign the cursor with the spoken words. In yet another embodiment, the software of the apparatus further contains instructions to adjust the cursor location by a reaction time variable.

DESCRIPTION OF THE DRAWINGS

FIG. 5b shows a hypothetical waveform of the written text of FIG. 5a; and

DETAILED DESCRIPTION

The accompanying Figures depict embodiments of the text editing system and methods of the present invention, and features and components thereof. With regard to references in this specification to computers, the computers may be any standard computer including standard attachments and components thereof (e.g., a disk drive, hard drive, CD player or network server that communicates with a CPU and main memory, a sound board, a keyboard and mouse, and a monitor). The microprocessor of the CPU in the computer may be any conventional general purpose single- or multi-chip microprocessor such as a Pentium® processor, a Pentium® Pro processor, a 8051 processor, a MIPS® processor, a Power PC® processor, or an ALPHA® processor. In addition, the microprocessor may be any conventional special purpose microprocessor such as a digital signal processor or a graphics processor. The microprocessor has conventional address lines, conventional data lines, and one or more conventional control lines. With regard to references to software, the software may be standard software used by those skilled in the art or may be coded in any standard programming language to accomplish the tasks detailed below.

a. General overview

Figure 1:
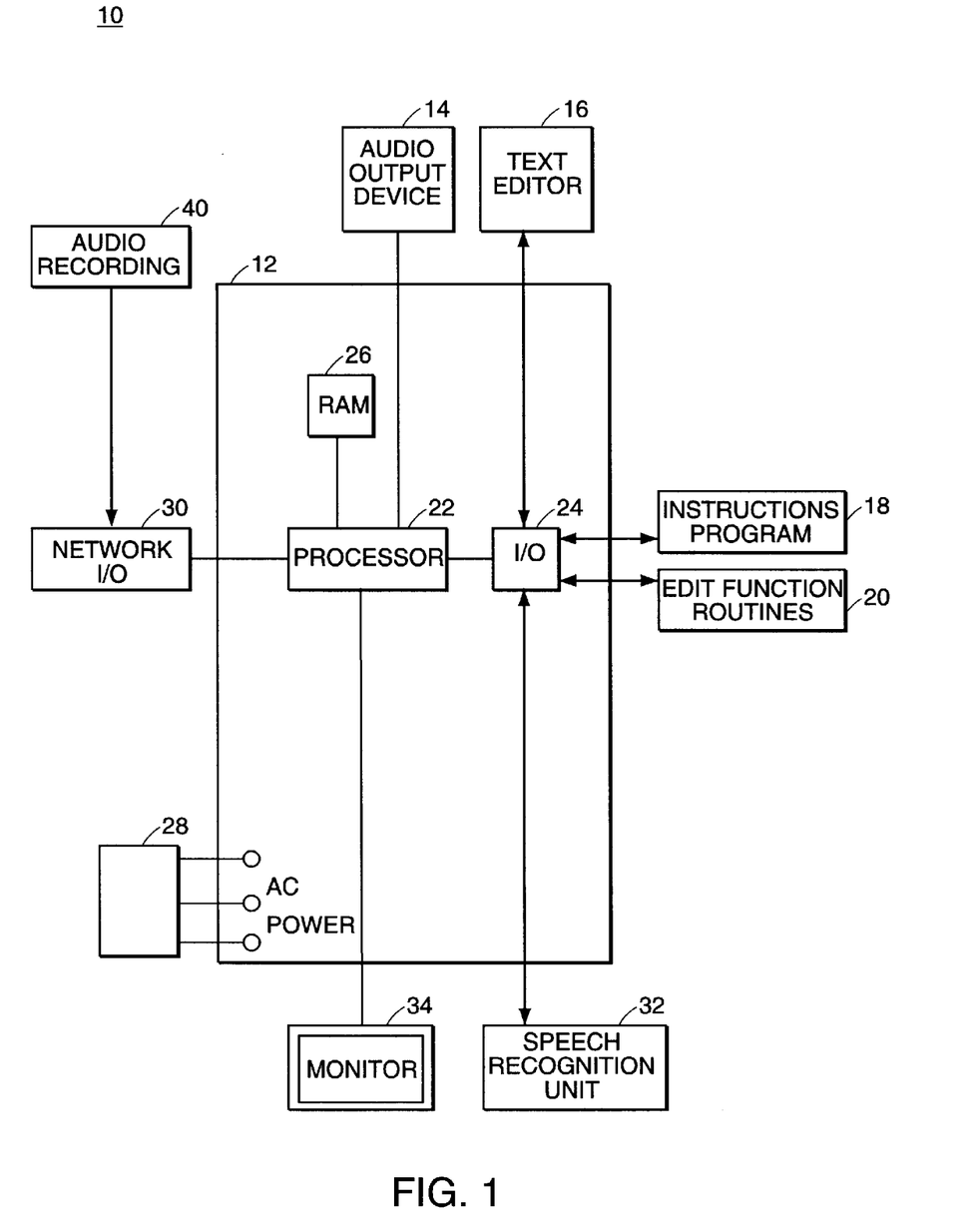
FIG. 1 is a block diagram overview of the invention.

The present system is shown in a general block-diagram form in FIG. 1. As shown in FIG. 1, the text editing system 10 in general comprises a computer 12, an audio output device 14, a text editor 16, an applications program 18, and edit function routines 20. The computer 12 comprises a processor or CPU 22 and an input/output interface 24 for communicating with various databases, files, or programs. The computer 12 also has a monitor 34 or other screen device. As is well known in the art, the computer 12 executes programs stored on a data storage medium so as to carry out the functions of the present invention. FIG. 1 illustrates various programs or software, such as the text editor 16, applications program 18, edit function routines 20, and speech recognition unit 32. Although these programs are listed separately in FIG. 1, these programs may be included within one software module which may collectively be referred to as software or a software program.

A high quality commercial speech recognition unit 32 may be used in the invention. One such commercial speech recognition unit 32 is the Truetalk product developed by Entropic Inc. This speech recognition unit 32, which runs on a computer 12, in general comprises an experience base and pattern recognition code to drive the speech recognition unit 32. The experience base contains important components of the speech recognition unit 32. The Truetalk speech recognition unit 32 contains three inter-connected modules within the experience base: an acoustic model, a language model, and a pronunciation dictionary. The three modules function together to recognize words in spoken speech. Although the speech recognition unit 32 described herein will be described with reference to the English language, the modules may be adapted to perform word recognition for other languages.

As illustrated in FIG. 1, the speech recognition unit 32 may take an audio recording 40 of speech as an input. In the embodiment of FIG. 1, the speech recognition unit 32 performs full word-level recognition of the audio recording 40. The audio recording 40, which may be a mu-law encoded 8-bit audio digital signal, is therefore converted into written text by the speech recognition unit 32. The speech recognition unit 32 may create a text file of the words in the audio recording 40. The text file contains not only the characters forming the recognized words but a beginning and ending time for each word and each silent pause in the recorded speech. The audio recording 40 and text file together form the output from the speech recognition unit 32.

The beginning and ending time of words in the text file may be used to label start and stop times of pauses during speech. During playback of the audio recording, silent pauses, which are pauses during speech that are not filled with speech, may be suppressed so that they are not played back. Similarly, filled pause "words," such as "um" or "ah," may be suppressed so that they are not played back. Filled pause "words," therefore, may need to be represented within the models of the speech recognition unit 32 so they may be treated much like other transcribable words. This will allow the speech recognition unit 32 to recognize and process filled pauses like any other word. If an adequate set of sounds for filled pause "words" is not found within the generic acoustic model, the acoustic model must be augmented with models for filled pause sounds that are as sophisticated as for other words. The pronunciation model and language model may also need to be modified to recognize these filled pauses as words. The significant point is that the present system may be configured so that filled pause "words" are recognizable by the speech recognition unit 32 with an accuracy comparable to other words.

During playback of the audio recording 40, the silent pauses and filled pause "words" may be suppressed so that the transcriptionist does not have to wait through these pauses to hear transcribable words. The text file output from the speech recognition unit 32 may also suppress the filled pause "words" so that they do not appear in the text on the monitor 34. In the embodiment shown in FIG. 5a, the silent pauses and filled pause "words" are represented by the brackets 64 between words. Brackets 64 do not appear in FIG. 5a between words where there is no pause in the speech. The lack of brackets 64, therefore, represents the lack of a pause between the spoken words.

The text file output from the speech recognition unit 32 may be a standard text file which may be edited using the text editor 16. This text editor 16, which may be a commercial text editor such as Corel WordPerfect® or a special text editor that aligns or identifies written words on the screen with spoken words during playback of the audio recording 40, may be used to correct errors within the written text.

The text editing system 10 may generally have two different modes: (1) a standard text editor mode, and (2) a playback edit function mode. In the standard text editor mode, the written word may be aligned with the spoken word during playback of the audio recording 40, but the user must stop the playback of the audio recording 40 and then edit the text using special edit function keys, which are explained below. Alternatively, in the standard text editor mode, the written word may not be aligned on the screen with the spoken word during playback of the audio recording 40, but instead the transcriptionist or user may simply edit the text using the special edit function keys. As explained above, numerous errors typically remain in the output from the speech recognition unit 32 and standard editing functions must be performed to produce quality transcribed text. The special edit function routines allow the transcriptionist to use one keystroke to perform a function normally requiring numerous keystrokes. The special edit function routines may also adjust the cursor to an appropriate insertion point for a certain text edit based on contextual rules if the cursor location is inappropriate.

In the playback edit function mode, the text editing system 10 allows the user to edit text generated by the speech recognition unit 32 and displayed on the monitor 34 quickly and easily without interruption during the playback of speech from an audio recording. As explained above, text editing programs have been developed to provide a way of aligning or identifying a particular spoken word from the audio recording 40 with the corresponding word text on the screen during playback of the audio recording 40 on an audio output device 14. This process aids the transcriptionist in identifying and fixing errors in the displayed text because the transcriptionist can listen to the original dictation and determine whether errors are present while following the text on the monitor 34. In playback edit function mode, the user may use the special edit function keys explained below to edit the text while listening to the audio playback without having to stop the audio playback to perform the text edits. During playback edit function mode, the cursor location for a text edit may be adjusted by a reaction time variable and the special edit function routines may adjust the cursor to an appropriate location for a certain text edit based on contextual rules if the cursor location is inappropriate.

b. Alignment of written words with spoken words

The program for playing the audio recording 40 and automatically aligning the cursor according to spoken words during playback of the audio recording 40 may be contained within an applications program 18, as shown in FIG. 1, or within any other program or module. In one embodiment, the instructions to play the audio recording 40 and to align the cursor according to the spoken words are contained within the text editor 16 itself.

Figure 4A:
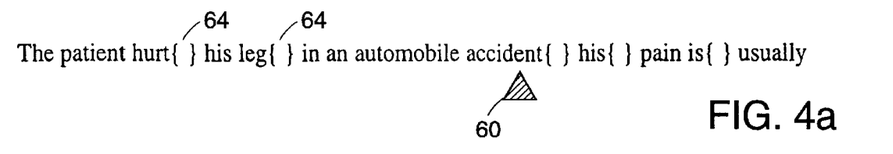
FIGS. 4a–4d illustrate the editing of one sample sentence to insert a period.
Figure 4B:
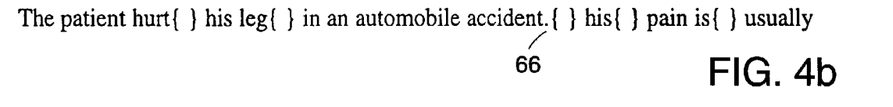
Figure 4C:
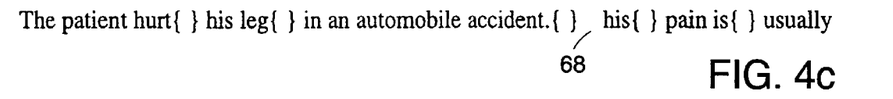
Figures 4D, 5A:
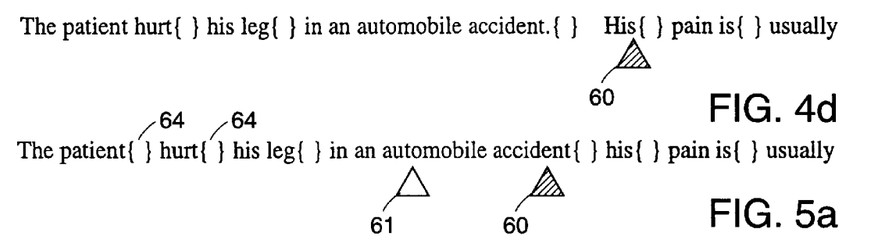
FIG. 5a shows a sample sentence with a cursor highlighting a word during playback of an audio recording.
Figure 5B:
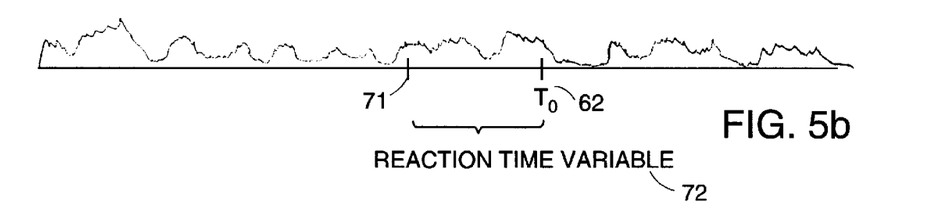

FIGS. 5a–5b illustrate a cursor aligning with or identifying a particular word in the written text with a particular spoken word reproduced during playback of an audio recording 40. The text editing system 10 of FIG. 5a may be capable of utilizing the beginning and ending times of words in the text file (the output from the speech recognition unit 32) and the waveform in the audio recording 40 to align the cursor 60 on the monitor 34 with a particular displayed word during playback of the audio recording 40. One way of doing this is to run the clock during replay of the audio digital recording 40 consistently with the time information in the text file. The cursor may then track the clock to align the written words with the spoken words. In FIG. 5a, which shows one line of written text during playback, the cursor 60 is aligned under the word "accident" as it is being reproduced in audio. More particularly, the cursor 60 travels from left to right through the word "accident" as it is being spoken. Any method of highlighting, underlining, or underscoring (such as in FIG. 5a) may be used to align the written word with the spoken word. FIG. 5b shows a hypothetical speech/audio waveform which corresponds to the displayed text of FIG. 5a. Time $T_o$ 62 in FIG. 5b represents the time location in the audio recording 40 which corresponds with the location of the cursor 60 in the text of FIG. 5a.

In either the standard text editor mode or playback edit function mode, the brackets 64 representing filled pause "words" or silent pauses may appear on the screen, but may be disabled so that they do not appear in a printed version of the text. During playback of the audio recording 40 the cursor 60 will track below the brackets 64 representing these pauses during playback of the pauses on the audio recording 40. Throughout this specification, when the cursor is defined to be between two words the cursor 60 is located in the space between the words (underneath the brackets 64 in FIG. 5a) representing the pause between the words, which may also be a pause at the end of a sentence or a pause for other punctuation. If there is no pause between words, no brackets 64 will be present on the screen, and the cursor will move immediately from one word to the next. If the cursor is defined to be within a particular word, the cursor will be below one letter of the word or the entire word will be highlighted or otherwise marked. A set of special edit function routines 20, which are described below, exist on the computer 12 to assist the transcriptionist in editing the written text of the text file resulting from the speech recognition unit 32.

c. Edit function keys

Special edit function keys may be used in the standard text editor mode or in the playback edit function mode to make text edits easier to perform. In the standard text editor mode described above, the transcriptionist uses the text editor 16 to edit the written text resulting from the speech recognition unit 32, either without playback of an audio recording 40 or by stopping playback of the audio recording 40 to perform edits. The transcriptionist may highlight one or more words or place the cursor within a particular word and then perform editing functions to correct the text. The edit function keys may be used to increase the efficiency of the user in performing these edits. In the playback edit function mode, the special edit function keys may be used to perform text edits without stopping playback of the audio recording.

Figure 2:
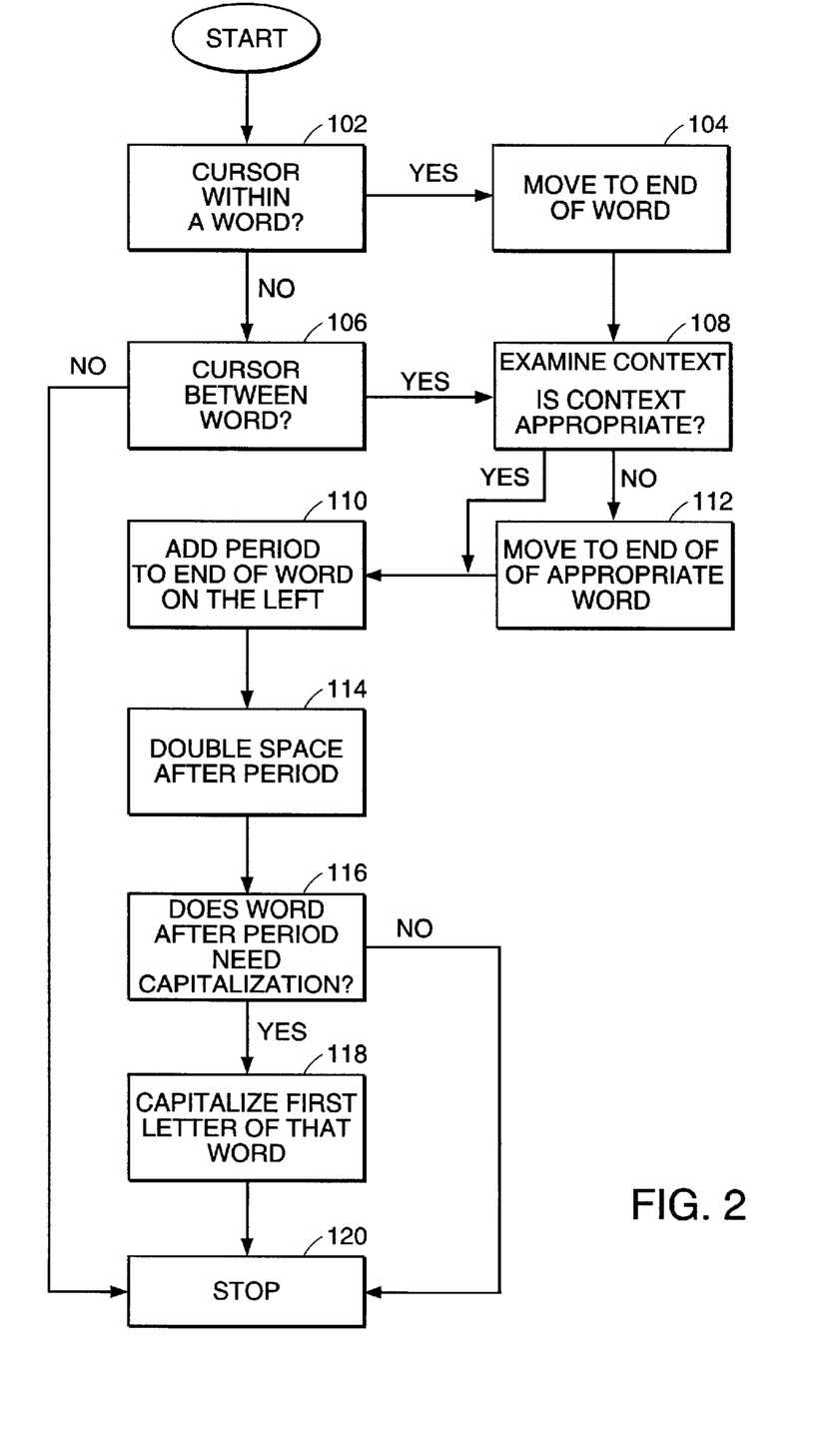
FIG. 2 is a flow chart of one embodiment of an editing function.

To make editing of the written text easier, edit function keys may be defined to perform various editing functions. A number of standard editing functions, such as insertion of a period or setting up a new paragraph, are typically needed to correct the text output from the speech recognition unit 32. In the embodiment of FIG. 1, the routines for these edit function keys are contained within the edit function routines base 20. An edit function key may be similar to a macro function, where one keystroke is shorthand for a longer sequence of keystrokes. Edit function keys, however, may have greater functionality than a standard macro in that edit function keys may perform complex and context-sensitive operations. Each edit function key may launch with a single keystroke a computer program of arbitrary complexity to perform certain specified functions. Edit function keys may therefore incorporate intelligent substitution rules. FIG. 2 illustrates a flow chart for one possible edit function routine.

In one embodiment, the reference point (or targeted insertion point) of an edit function routine is the cursor position at the time the particular edit function key is pressed.

For instance, in FIG. 4a the cursor 60 is on the word "accident." If an edit function routine is called when the cursor 60 is on the word "accident," the function will be performed with the word "accident" as the base location of the cursor 60 for the edit function. Although a cursor typically defines a point on the monitor 34 and not an entire word, edit function routines will typically treat an entire word as selected for performance of the editing function, even if the cursor is within the letters of a word. The distinction between a cursor position within a word and the highlighting of a word is therefore largely inapposite for the editing functions. When the text editor 16 is used to edit the written text in standard text editor mode one or more words may be selected or highlighted by the cursor. If more than one word is selected, the starting point for an edit function routine may be either the first highlighted word, the last highlighted word, or at the location of a word a set number of spaces away from the first or last word.

1. Context sensitive applications

In either standard text editor mode or playback edit function mode, the function of the edit function keys may be made more complex by the addition of context sensitive application of the functions. Context sensitive application of the functions refers to the evaluation of the cursor location or targeted insertion point when a particular routine is called. If the cursor location is inappropriate for the function of a particular edit function key, the routine may either find the correct location for the function (by moving forward or backward in the text) or refrain from performing the function. In other words, the context sensitive application of the functions allows the targeted insertion point (cursor location) where a text edit will be performed to be adjusted to an appropriate insertion point for the text edit.

In one embodiment, grammar constraints may be used to ensure that the editing function is performed in the proper location. For example, words in English, especially articles, prepositions, and conjunctions, should not come at the end of a sentence. If an edit function key defined to insert a period at the end of a word selected by the cursor is called, the function may evaluate that word to determine if the context for insertion of a period is correct. For example, if the word "of" is selected, the routine will examine the context and determine that insertion of a period after the word "of" is typically not correct in English grammar. The routine will then search to the right of the word "of" for a noun that ends the prepositional phrase, and the routine will insert a period at that location. If the prepositional phrase is "of the end," the routine will find the word "end" and insert a period after that word. A linguistic analysis of the context of the word "of" would therefore determine that a period is proper after the word "end" and not after the word "of."

Another example of a context sensitive application may be used in conjunction with an edit function routine to capitalize the first letter of a selected word. If the phrase "a man" exists and the transcriptionist wishes to capitalize the word "a," but accidentally strikes the edit function key when the word "man" is selected, the routine may determine that the word "a" is not the proper ending of a sentence, and it therefore should be capitalized as the first letter of the sentence. In this example, therefore, the context sensitive application would evaluate the context of the word "man" and capitalize the word "a" instead as the first word of a sentence.

2. Examples of edit function keys

Edit function keys may be defined to perform a wide variety of editing functions, a number of which follow. The following examples are illustrative and are intended as examples only and are not a complete listing of possible edit function keys. In the embodiments below, the initial targeted insertion point of an edit function key is the cursor position at the time the particular edit function key is pressed. The actual starting point (or appropriate insertion point) for an editing function, however, may be defined to be any number of words or spaces away from the cursor location (targeted insertion point) in the written text, or it may be adjusted by the context sensitive applications.

EXAMPLE 1

Period Edit Function Key. In one embodiment, an edit function key may be defined to insert a period, space properly after the inserted period, and capitalize the next word after the period. The exclusion of a period is a common error in the output text of a speech recognition unit 32, largely because periods are typically not spoken during normal speech.

FIG. 2 shows a flow chart of one embodiment of the period edit function key. In FIG. 2, upon a command from the user that enters the period edit function routine, the routine at block 102 may first determine whether the cursor is within a word when the routine is entered. If the cursor is located within a word, at block 104 the cursor is moved to the end of that word if it is not already there. If the cursor is not within a word, but is instead between words, the cursor remains between the words, as shown in block 106 and 108. If the cursor is neither between words or within a word (which indicates some problem with the functioning of the system), the cursor may either remain where it is (not shown in FIG. 2), or the routine may jump to block 120, thus ending the routine.

At block 108 of FIG. 2 the routine examines the context in which the period may be inserted to determine if the context is correct. For example, a period is not normally placed after an article (such as "a" or "the"), a preposition (such as "of" or "in"), or conjunctions (such as "and"). In such a case, the routine will examine the context and move to the appropriate position in the manner described above. For instance, if the phrase is "of the leg," the cursor will be moved to after the word "leg" so that a period may be inserted at that location. This act of moving to the end of the appropriate word is represented by block 112 in FIG. 2.

Block 110 depicts the insertion of a period in the text at the end of the word to the left of the cursor. In the example above, for instance, the period would be inserted at the end of the word "leg." Block 114 illustrates the act of ensuring that there is a double space after the period, which may require adding one or two spaces depending on the spacing at the time. Capitalization of the next word after the period may be the next step in the routine of FIG. 2. If the word to the right of the period is already capitalized, the routine, at block 116, will jump to the end of the routine, block 120. If capitalization is necessary, the routine will capitalize the word to the right of the period at block 118 prior to exiting the routine at block 120. Although this routine for the insertion has been described with reference to the specific embodiment of FIG. 2, other routines known to those skilled in the art could be followed to perform the same function.

EXAMPLE 2

Comma Edit Function Key. If the cursor is within a word, this function may add a comma to the end of the word on which the cursor is located. If the cursor is between words, this routine may add a comma to the end of the word to the left of the cursor.

EXAMPLE 3

Hyphen Edit Function Key. This function may add a hyphen between words, and it may also edit the text so that no spaces exist between the hyphenated words. If the cursor is within a word, the function may add a hyphen immediately after that word. If the cursor is between two words, the function may insert a hyphen between the two words. If two or more words are selected or highlighted by the cursor, a hyphen may be inserted between all of the words (e.g. 21-year-old). In one embodiment, the hyphen function will replace all spaces between two or more words with a hyphen.

EXAMPLE 4

Quote Edit Function Key. If the cursor is within a word, this function may add double quotes to the beginning and ending of the word. If the cursor is between two words, this function may double quote the word on the left. If two or more words are selected, this function may insert a double quote to the left of the first word in the selection and to the right of the last word in the selection. This function may also be capable of adjusting the punctuation near the quotes. For example, a comma may be necessary at the beginning of a quote, and the routine may be modified to provide for the insertion of a comma at the beginning of the quote.

EXAMPLE 5

Paragraph Edit Function Key. This routine may first perform the period edit function (Example 1 above) if necessary, and then begin a new paragraph after the period and before the next sentence. In another embodiment, this routine may simply begin a new paragraph at the cursor location or at the end of a word if a word is selected by the cursor.

EXAMPLE 6

Section Headers Edit Function Key. This function, which may also include other functions such as the period edit function, may insert the appropriate section header after the selected word, double space, and capitalize the next word if necessary. A section header could be, for example, the number "1" or "2," or the letter "A" or "B." If the cursor is within a word, or a group of words is selected by the cursor, this routine may replace the current word or selection with the section header text and format the surrounding text in an appropriate manner.

In the medical transcription field, the letters "SOAP" refer to different areas of a physician's record and are typically used as section headers in physician's record. The "S" refers to the subjective component of the record or, in other words, the symptoms of the patient from the patient's point of view. An "S:" followed by a tab is commonly used as a section header for this section of a medical record. The "O" refers to the objective view of the patient or, in other words, the physician's observations of the patient. An "O:" followed by a tab is commonly used as a section header for this section of the record. Similarly, the "A" is used as a section header for the physician's analysis or assessment of the patient's condition. Finally, the "P" is used as a section header for the physician's plan for treatment of the patient.

Physicians commonly do not remember to dictate the "S:" or "O:" when dictating medical records. In the medical transcription business, therefore, it is helpful to define section header function keys that will begin a new section (insert an S, O, A, or P followed by a colon and a tab) for the different sections of the medical record. In one embodiment, a section header function key may be defined to begin a new paragraph with the first word of a sentence in which a word is selected by the cursor. The function could then insert the appropriate letter for the section followed by a colon and a tab. This embodiment would allow the transcriptionist to quickly insert a new section header for the medical record if the physician forgot to dictate the new section.

EXAMPLE 7

Capitalization Edit Function Key. This function may change the first letter of a selected word to a capital letter. If the cursor is between words, this function may change the first letter of the word to the left of the cursor to a capital letter.

d. Playback edit function mode

The edit function keys were described above largely in reference to the standard text editor mode where the user moves the cursor to the desired location to perform an editing function or stops playback of the audio recording 40 to perform a text edit. In the alternative mode, the playback edit function mode, the text editor 16 aligns or identifies a word in the written text on the screen with the same spoken word during playback of an audio recording 40, and the user can perform text edits without stopping playback of the audio recording 40.

In this embodiment, it is useful to allow the transcriptionist to use the edit function keys described above to edit the written text during playback of the audio recording 40. As the audio is played back, each word is highlighted or underlined by the cursor as it is spoken, and then an edit function routine is performed on the particular word highlighted when the edit function routine is called.

In the playback edit function mode, therefore, edit function keys may be used at any time during playback of the audio recording 40. When an edit function key is typed during playback, the appropriate action may be applied to the word that was highlighted (or underscored) or being spoken when the edit function key was pressed. The reference location for a text edit is therefore coordinated with a targeted insertion point where the text edit should be performed. Because the spoken word is aligned with the same word in the written text, the editing function of an edit function key may be based from the location of the spoken word or a pause between words in the waveform audio recording 40 or from the location of the highlighted word in the written text. Although these two locations may typically be identical, the spoken word may be slightly ahead or behind the highlighting of written text during playback of the audio recording 40. In one embodiment, therefore, the editing functions may be taken in reference to the location of the cursor in the written text on the screen.

In playback edit function mode, playback of the audio recording 40 does not stop when text edits are performed using the edit function keys (unless the user explicitly stops playback), or, if playback does stop, it only stops briefly so that the screen may be updated. Typically, for example, if an edit function key is depressed during playback edit function mode, the editing function will be performed and then the screen will be refreshed with the cursor realigned with the spoken words of the audio recording 40. This may make the editing process simple and less time-consuming for the transcriptionist because playback of the audio recording 40 need not be stopped to perform editing functions.

FIGS. 4a–4d show the appearance of one line on the screen during playback edit function mode during four time periods which may be almost instantaneous in nature. In FIG. 4a, the cursor is underneath the word "accident" at the same time that this word is being spoken on the audio recording 40. The period edit function key is then depressed. FIG. 4b shows the insertion of a period 66 immediately after the word "accident." FIG. 4c then shows the insertion of spaces 68 after the word "accident." Finally, FIG. 4d illustrates the capitalization of the word "His" at the beginning of the next sentence. FIG. 4d is a view of this line on the screen a moment after the view in FIG. 4a. In FIG. 4d the word "His" is being spoken on the audio recording 40, as indicated by the cursor position. The snapshot views of FIGS. 4b and 4c are almost instantaneous and unnoticeable by the transcriptionist. After the period edit function key is depressed, the screen refreshes into a view similar to FIG. 4d with the word currently being spoken on the audio recording 40 underscored by the cursor 60.

e. Reaction time variable

Although the system and method described above may aid in editing text during playback of an audio recording 40 (during playback edit function mode), it may be difficult for the transcriptionist to depress the appropriate key calling an edit function routine while the desired word is underscored by the cursor. Because the transcriptionist may have to be quick in depressing proper edit function keys, pressing an edit function key too late can cause an editing action to apply to the wrong word. To aid the transcriptionist, therefore, a reaction time variable may be defined within the edit function routines base 20 of FIG. 1. This reaction time variable may be defined to allow the computer 12 to adjust for individual differences in reaction time. A reaction time variable can be configured for each individual transcriptionist and for each speaker. The reaction time variable can compensate for the transcriptionist's reaction time by adjusting the location of an editing function by the reaction time.

In one embodiment, the reaction time variable may be computed as a function of the rate of speech of the speaker on the audio recording 40. If the speaker speaks a set number of words per minute, for instance, the reaction time variable may be automatically computed. The number of words spoken in one minute may be computed and then used to set an appropriate reaction time variable. A simple formula to determine a reaction time variable could be $R_t = K * W_m$, where $R_t$ is the reaction time variable in milliseconds, K is a constant (such as 2.5), and $W_m$ is the number of words spoken by the speaker in one minute. Although the reaction time variable may be defined in terms of time, it adjust the cursor location to its position at a time $R_t$ before depression of an edit function key.

Figure 5C:
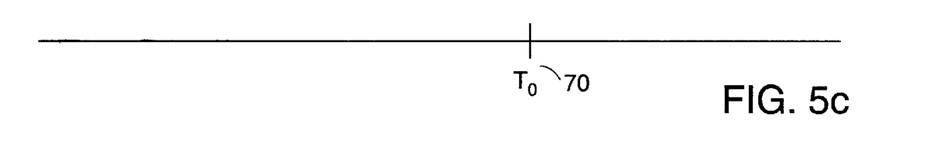
FIG. 5c shows a time line in which a keystroke to perform an editing function is depicted.

FIG. 5c shows the depression of an edit function key at time $T_o$ 70 during playback of the audio recording 40. At time $T_o$ 70, the word "accident" is underscored, as indicated in FIG. 5a. In the absence of a reaction time variable, therefore, the base word for the editing function will be the word "accident." If, however, the transcriptionist meant to select the word "automobile" in FIG. 5a, the transcriptionist's reaction time would not have been quick enough to select that word.

If a reaction time variable 72 is defined to be 250 milliseconds, as shown in the real-time time line of FIG. 5b, the editing function would be applied to the word selected by the cursor 250 milliseconds before the edit function key was depressed. In FIGS. 5a, 5b, and 5c, for example, the location of the cursor 61 is at its location 250 milliseconds before time $T_o$ 70, 62 (when the key was depressed). The time when the cursor 61 is at this location, denoted by numeral 71 in FIG. 5b, is time $T_o$–250 milliseconds. In FIG. 5a, therefore, the base position of the cursor 61 for purposes of the editing function will be on the word "automobile." In many situations, the reaction time variable 72 will not alter the insertion point for an editing function because the same word will be selected after an adjustment for the reaction time variable 72. If the adjustment from the reaction time variable 72 results in an insertion point at a pause between words, the cursor will simply be treated as being between words and the editing function will be applied accordingly as described in the examples above.

Selection of a reaction time variable 72 for each transcriptionist may require experimentation so that the editing functions are applied to the correct words. If an automatic reaction time variable 72 is set for a given speaker in the manner described above, the constant K may be changed for each transcriptionist. Although it may be difficult to define a reaction time variable 72 to result in the proper selection of the word for an editing function, the reaction time variable 72 may be used in conjunction with the context sensitive applications described above to improve editing results. If the reaction time variable 72 results in the improper selection of an insertion point for an editing function, the context sensitive application within an edit function routine may account for the problem by determining the proper insertion point for the editing function.

f. Operation of the text editing system

A flow chart of the operation of one embodiment of the text editing system 10 is shown in FIG. 1. At block 201, the transcriptionist enters the text editor 16 to begin an editing session. The transcriptionist can perform normal text editing functions at block 202 using standard functions of the text editor 16. At block 203 the routine determines if a user command is a command to begin playback of an audio recording 40. If the command is not a command to begin playback of an audio recording 40, the routine enters standard text editor mode and determines whether the command is a standard text editing command at block 212. If the command is a standard text editing command of the text editor 16, the standard editing function is performed, as depicted in block 216. If the command received from the user is one of the edit function key commands (as described above), the routine to perform that function at the cursor location (or word, sentence, or paragraph location) is called and performed at block 214.

Figure 3:
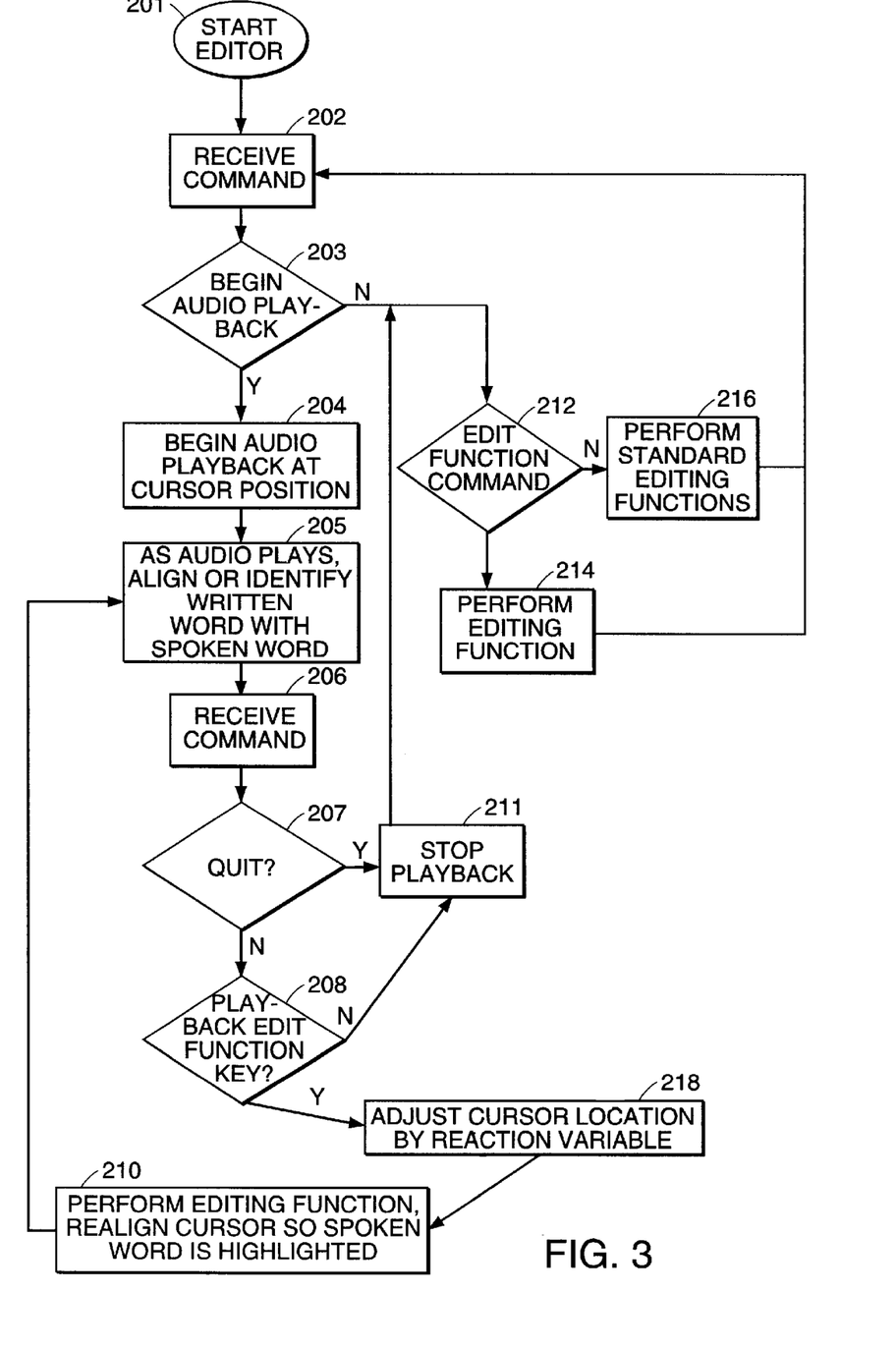
FIG. 3 is a flow chart of one embodiment of the invention.

If the command received from the user at block 203 is a command to begin audio playback, the text editor 16 will begin playback of the audio recording 40 at the cursor position at block 204, and playback edit function mode will be entered. The cursor will therefore track underneath the written word that is being spoken in the audio recording 40 in the manner described above. In other words, beginning at block 205 each word is highlighted or underscored by the cursor as it is spoken. The highlighting of words in the text continues until the transcriptionist issues a command (usually via a keyboard, although any input method, including voice, may be used).

At block 206 the transcriptionist issues a command and the system 10 receives the command. If the command is to quit the audio playback, the audio playback stops and the text editing session during playback of the audio recording 40 ends, as indicated by block 207 and 211. The cursor will be placed on the word on which the cursor is located at the time of the command and the text editor 16 will then function as a normal text editor. If the command is not a stop command or a playback edit function command, the playback of the audio will stop and the normal text editing functions will be performed as indicated by blocks 208 and 211.

If the command received at block 206 is a playback edit function command (calling an edit function key), the appropriate editing sequence is applied to the word that was highlighted at the time the key was pressed (or as adjusted by the reaction time variable). Block 218 indicates the adjustment of the cursor location by the reaction time variable and block 210 depicts the performance of playback edit functions and the realignment of the spoken word with the cursor. The cursor is therefore realigned and the audio playback continues. The playback of the audio and the alignment of the spoken word with the written text continues until the transcriptionist issues a quit command or any other command except for a playback edit function command.

Whenever editing functions are performed by the system 10, it is possible that the routine will use context sensitive applications to alter the insertion point for an editing function. At blocks 210 and 214, therefore, the routine may call any one of the edit function key routines, and the edit function key routine may contain logic for context sensitive applications.

Use of the system and methods described above can decrease the editing time needed for text resulting from speech recognition units 32. If the playback edit function mode is used to edit the text, the text editing process may take no longer than it takes the transcriptionist to listen to the audio recording 40 without interruption.

While the present invention has been described with reference to several embodiments thereof, those skilled in the art will recognize various changes that may be made without departing from the spirit and scope of the claimed invention. Accordingly, this invention is not limited to what is shown in the drawings and described in the specification but only as indicated in the appended claims. Any numbering or ordering of elements in the following claims is merely for convenience and is not intended to suggest that the ordering of the elements of the claims has any particular significance other than that otherwise expressed by the language of the claims.

What is claimed is:

1. A method for editing written text in a text editor which automatically aligns a cursor in the written text on a screen with a particular spoken word during playback of an audio recording, the method comprising:

(a) aligning the cursor to a targeted insertion point in response to a user's input and a reaction time variable so that the insertion point lags behind the playback by a reaction time that allows the user to respond to the spoken word and input an editing function instruction for the text word that corresponds to the spoken word;

(b) performing the input editing function at the targeted insertion point; and (c) realigning the cursor with the spoken words, delaying by the reaction time variable so that the insertion point lags behind the playback by the reaction time.

2. The method of claim 1 wherein the act of aligning further comprises:

(i) determining whether the targeted insertion point is an appropriate insertion point for one or more text edits, and (ii) adjusting the cursor location to an appropriate insertion point if the targeted insertion point is inappropriate.

3. The method of claim 2 further comprising refreshing the screen after the act of performing.

4. The method of claim 1 wherein the act of adjusting further comprises computing the reaction time variable as a function of a rate of speech in the audio recording.

5. The method of claim 1 further comprising performing full word-level speech recognition to produce a draft of the written text prior to steps (a) through (c).

6. The method of claim 1 further comprising stopping playback of the audio recording in response to a quit command from a user.

7. The method of claim 6 further comprising reverting to a standard text editor.

8. The method of claim 1 further comprising determining whether one or more edits are appropriate and performing one or more edits only if appropriate.

9. The method of claim 8 wherein the act of determining further comprises evaluating the context of words to determine whether one or more edits are appropriate.

10. The method of claim 9 wherein the act of evaluating comprises ensuring that one or more words that are at the targeted insertion point that are a preposition, article, or conjunction are not a final word in a sentence.

11. An apparatus for editing written text comprising:

(a) a text editor that automatically aligns a cursor in the written text with a particular spoken word during playback of an audio recording; and (b) software containing instructions to:

(i) align the cursor to a targeted insertion point in response to a user's input and a reaction time variable so that the insertion point lags behind the playback by a reaction time that allows the user to respond to the spoken word and input an editing function instruction for the text word that corresponds to the spoken word, (ii) perform the input editing function at the targeted insertion point, and (iii) realign the cursor with the spoken words, delaying by the reaction time variable so that the insertion point lags behind the playback by the reaction time.

12. The apparatus of claim 11 wherein the software further contains instructions to determine whether the targeted insertion point is an appropriate insertion point for one or more text edits and to adjust the cursor location to an appropriate insertion point if the targeted insertion point is inappropriate.

13. The apparatus of claim 12 further comprising a speech recognition unit to perform full word-level recognition and produce a draft of the written text.

* * * * *

UNITED STATES PATENT AND TRADEMARK OFFICE
CERTIFICATE OF CORRECTION

PATENT NO. : 6,360,237 B1  Page 1 of 1
DATED : March 19, 2002
INVENTOR(S) : David E. Schultz et al.

It is certified that error appears in the above-identified patent and that said Letters Patent is hereby corrected as shown below:

Column 14,
Line 30, replace "claim 2" with -- claim 1 --.

Signed and Sealed this

Fifth Day of November, 2002

*Attest:*

*Attesting Officer*

JAMES E. ROGAN
*Director of the United States Patent and Trademark Office*